US005911678A

United States Patent [19]

White

[11] Patent Number: 5,911,678

[45] Date of Patent: Jun. 15, 1999

[54] GAS TURBINE ENGINE STARTING

[75] Inventor: Cyril M. White, Plantsville, Conn.

[73] Assignee: Rolls-Royce plc, London, United Kingdom

[21] Appl. No.: 09/114,215

[22] Filed: Jul. 13, 1998

Related U.S. Application Data

[63] Continuation-in-part of application No. 09/109,894, Jul. 2, 1998, which is a continuation-in-part of application No. 08/891,500, Jul. 7, 1997.

[51] Int. Cl.[6] .................................................. F02C 7/06

[52] U.S. Cl. ................................ 60/39.08; 60/39.141

[58] Field of Search ......................... 60/39.08, 39.141, 60/39.142; 184/6.11

[56] References Cited

U.S. PATENT DOCUMENTS

| | | | |
|---|---|---|---|
| 2,751,149 | 6/1956 | Newcomb | 60/39.141 |
| 2,761,281 | 9/1956 | Armer | 60/39.08 |

FOREIGN PATENT DOCUMENTS

| | | | |
|---|---|---|---|
| 849043 | 9/1952 | Germany | 60/39.141 |

*Primary Examiner*—Louis J. Casaregola

*Attorney, Agent, or Firm*—W. Warren Taltavull; Farkas & Manelli PLL

[57] ABSTRACT

A gas turbine engine is provided with an air supply adapted to provide air to an engine starter system. The engine is also provided with an oil based lubrication system and control system. The control system is adapted to provide oil to the lubrication system under pressure from the starter air supply.

12 Claims, 4 Drawing Sheets

1
15
10
13
14
12
11

GAS TURBINE ENGINE STARTING

This application is a continuation-in-part of Ser. No. 09/109,894 filed Jul. 2, 1998 which is a continuation-in-part of Ser. No. 08/891,500 filed Jul. 7, 1997.

THE FIELD OF THE INVENTION

This invention relates to gas turbine engine starting. More particularly but not exclusively this invention relates to a method and apparatus for providing an oil pressure in an oil system of a gas turbine engine for start-up conditions.

BACKGROUND OF THE INVENTION

Conventional gas turbine engines include an integral oil system in which oil is pressurised by a pump driven by one of the rotating shafts. Oil flow from the pump and the system pressure require that the relevant engine shaft be rotating. Hence at the point of engine start the shaft is stationary and there is no pump rotation or delivery pressure. These conditions may result in inadequate oil supply or inadequate pressure in various areas in the lubrication system during the start cycle.

Prior art proposals for the starting process of a gas turbine engine include the use of a pneumatic starter which is fed by air pressure from a supply source external to the engine and under the control of a starter air valve. When the engine reaches a self sustaining speed the starter air supply is switched off.

SUMMARY OF THE INVENTION

It is an object of the present invention to provide improvements relating to an oil supply system during engine starting and/or to provide improvements generally.

According to the present invention there is provided a gas turbine engine oil based lubrication system which comprises a main oil supply and oil pressurisation means; with which during at least part of the operation of the gas turbine engine an air supply means is arranged to provide a supply of compressed air to the gas turbine engine; wherein the lubrication system further comprises a supplementary oil supply and oil pressurisation means which are adapted to provide, under the influence of said compressed air, a discrete quantity of oil and oil pressurisation within at least a part of the oil based lubrication system.

Advantageously the secondary oil supply and oil pressurisation means provides an alternative, or boosted, means of oil supply and oil pressurisation for the lubrication system. Since this alternative means is driven independently of the main means by compressed air it can provide oil to the lubrication system when insufficient oil or oil pressurisation is being provided by the main means.

Preferably the discrete quantity of oil and oil pressurisation are provided during starting of the gas turbine engine. The air supply means may further be arranged to substantially simultaneously provide a supply of compressed air to an engine starter unit.

Advantageously the need for rotation of the engine which drives the main supply means, before any lubrication can occur, is now not required. The secondary means operates under the air pressure from the starting air supply and oil is therefore provided in the lubrication system of the engine before 'start-up' of the engine.

Preferably the compressed air is arranged to provide at least part of the oil pressurisation within the supplementary oil supply and oil pressurisation means.

The secondary oil supply and oil pressurisation means may be arranged to provide oil and oil pressurisation to a bearing in the gas turbine engine. Furthermore they may be arranged to provide oil and oil pressurisation to an oil damper.

A restriction means may be provided to control, in use, a flow of oil from the common pipework into the secondary oil supply and oil pressurisation means.

Advantageously this restriction ensures that the oil is preferentially supplied to the desired parts of the oil system.

BRIEF DESCRIPTION OF THE DRAWINGS

The present invention will now be described, by way of example, with reference to the accompanying drawings, in which.

DETAILED DESCRIPTION OF THE INVENTION

Figure 1:
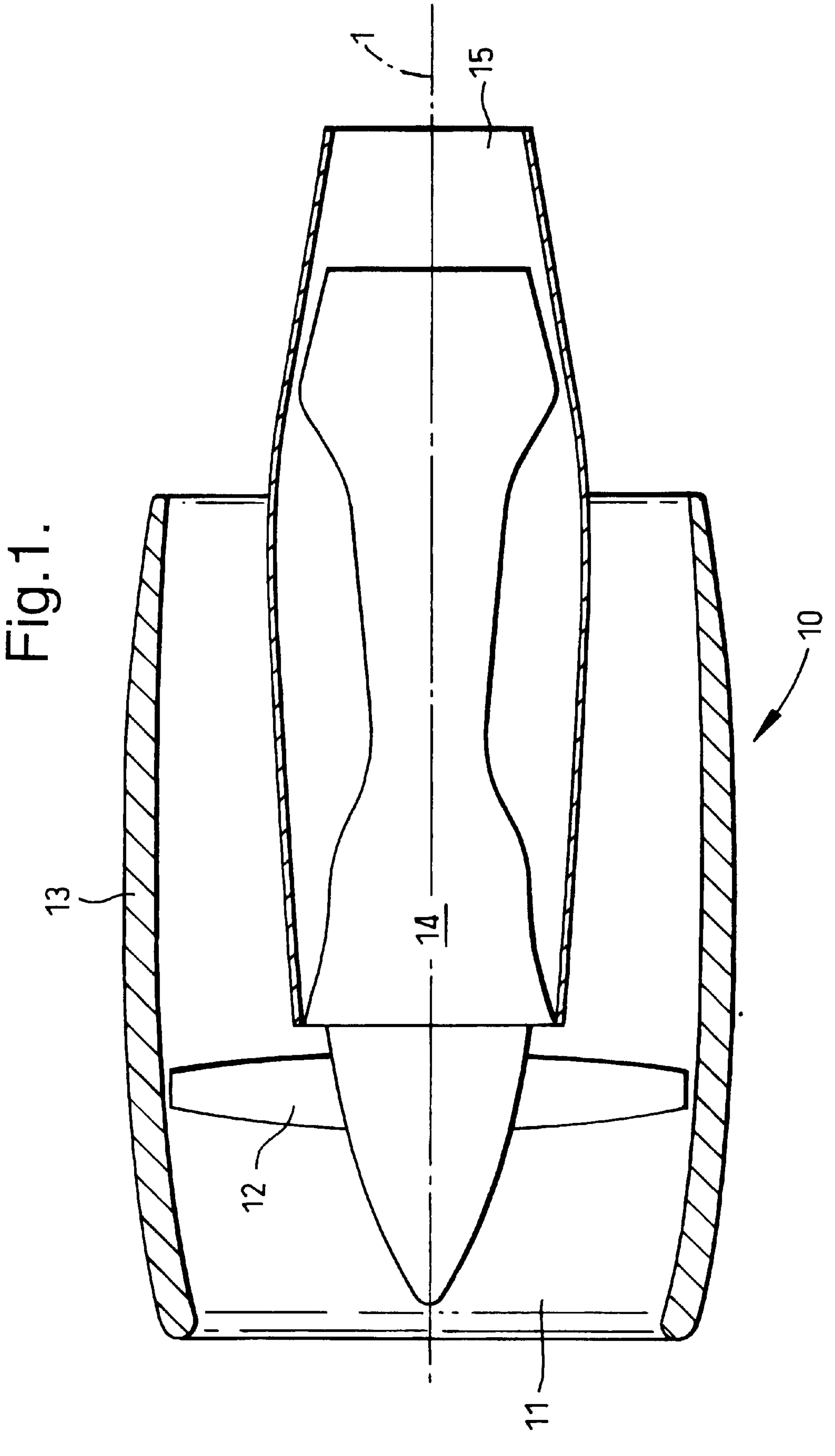
FIG. 1 is a partially sectioned side view of a gas turbine engine in accordance with the present invention.

With reference to FIG. 1, a gas turbine engine generally indicated at 10 comprises an air intake 11, a fan 12 contained within a duct 13, the core 14, of the engine 10, and an exhaust nozzle 15.

The engine 10 functions in the conventional manner whereby air entering the engine 10 through the intake 11 is compressed by the fan 12. The air exhausted from the fan 12 is divided into two flows. The first and major flow passes through the duct 13 around the outside of the core 14 to be exhausted from the downstream end of the duct 13 and to provide propulsive thrust. The second flow is directed into the engine core 14. There it is compressed further before being mixed with fuel. The fuel/air mixture is then combusted. The resultant products then expand through the core engines' turbines before being exhausted through the exhaust nozzle 15 to provide additional propulsive thrust. The turbines in the engine core 14 drive the fan 12 in addition to the core engine's compressors in the conventional manner by coaxial shafts 2 extending along the longitudinal axis 1 of the engine 10.

The gas turbine engine 10 is therefore of conventional construction.

Figure 2:
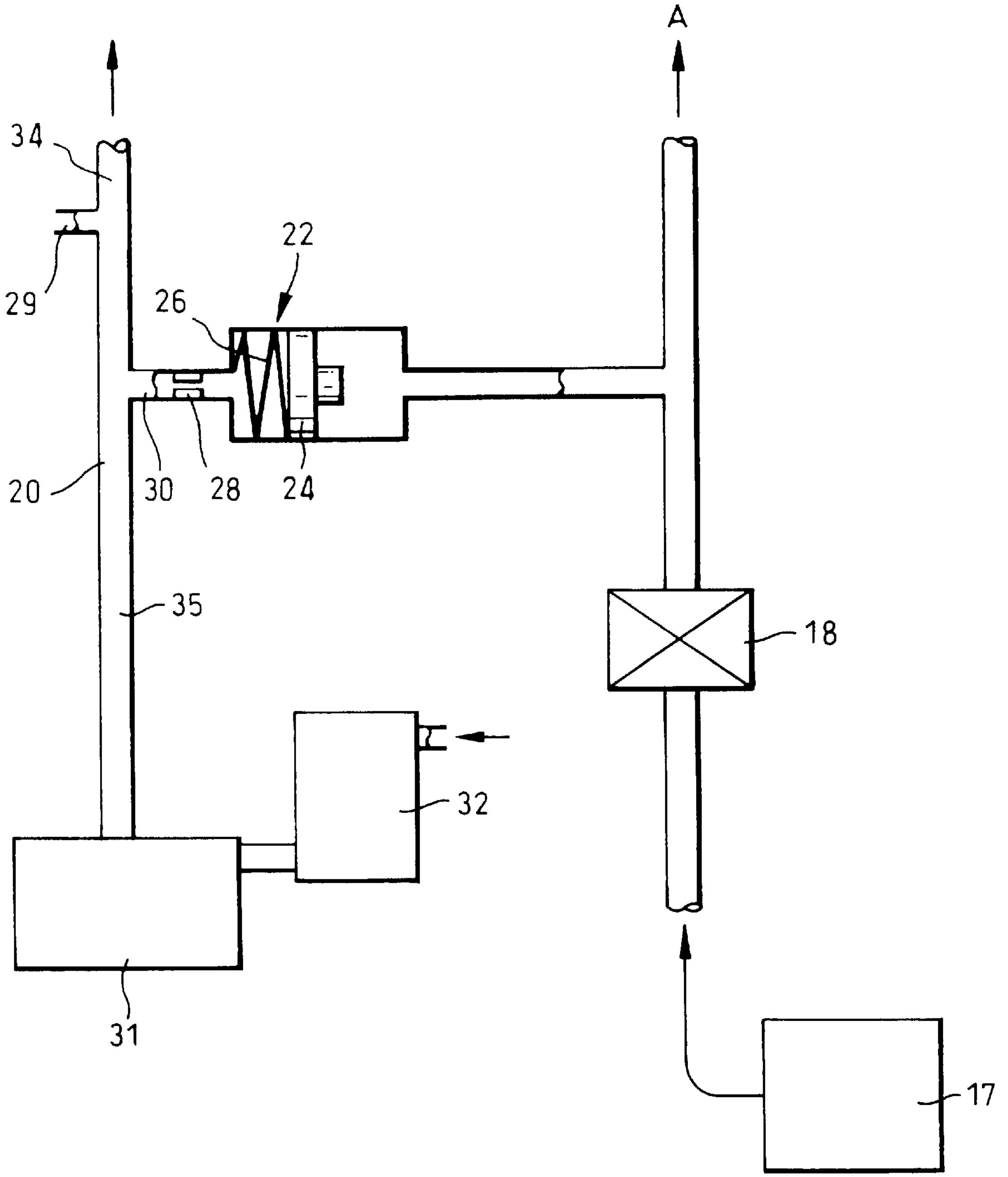
FIG. 2 is a schematic view of a lubrication system in accordance with the present invention.

Now referring to FIG. 2, starter air valve 18 supplies compressed air to the starter from a suitable air supply means 17, for example an external compressor or bled from another engine. This air (indicated by arrow A) is used to blow a suitable amount of oil into the pipework 20 to provide a suitable bearing oil supply 34 at the required pressure. This occurs before the engine system has achieved any significant rotational speed and thus before the oil pressure pump 31, which is driven from the engine rotation has put any significant quantity of oil or pressure into the system.

A free floating piston chamber 22 or diaphragm connects the oil supply pipework 20 and the starter air supply from the starter air valve 18. The volume swept by piston 24 within the chamber 22 is chosen to be suited to the anticipated volume required to raise the pressure and flow to the required level until the output 35 pressure of the engine driven oil supply pump 31 matches the pressure created in the oil system by the movement of the piston 24. The volume swept, and thence the amount oil supplied and pressurisation being either sufficient to provide all the oil required by the lubrication system and bearings supply 34 during starting, or sufficient to augment that supplied by the oil pump 31 during starting to raise the total supply to the required level. During running of the engine once the starter air pressure has been removed by valve 18, the oil pressure would be used to fill the chamber volume on the oil side since the air side would then be at ambient pressure. A bias spring 26 inhibits the tendency to expel oil whilst the engine is static and no air is being supplied to the starter.

The oil chamber 22 is also positioned so that the oil entry or exit at the top minimizes draindown after engine shutdown. Oil from an oil tank 32 is delivered to the engine driven oil pump 31 from where it is then delivered to the oil pipework 20 via feed pipe 35. This pump, during normal engine operation, produces a flow of pressurised oil to feed pipe 35. The pressurised supply in feed pipe 35 takes over from the start up supply delivered via pipe 30 from the free floating piston chamber 22 once sufficient rotational speed and so pressure from the oil pump 31 has been achieved. During engine starting when the starter air pressure is applied, pressure on the 'air' side is greater than that of the oil side such that the resultant movement of the piston 24 or diaphragm expels oil into the supply pipework 20 so providing a suitable bearing oil supply 34 at a suitable pressure. The pressurisation being provided by the movement of the piston 24 and the starter air pressure.

When the engine has reached self sustaining speed the starter air is cut off by the starter air valve 18. The oil pressure provided by the engine driven oil pump 31 and flow of oil within the oil pipework 20 will then result in movement of the piston 20 back towards the 'air' side, so refilling the chamber 22. To avoid sudden but temporary loss of the bearing oil supply 34 to the nearby bearing due to the recharging of the holding chamber 22 a restrictor or valve 28 may be provided in the oil feed passage 30. The restrictor or valve 28 reduces the flow of oil back into and recharging the chamber 22 until the oil pressure in the oil pipework reaches an operating level.

Figure 3:
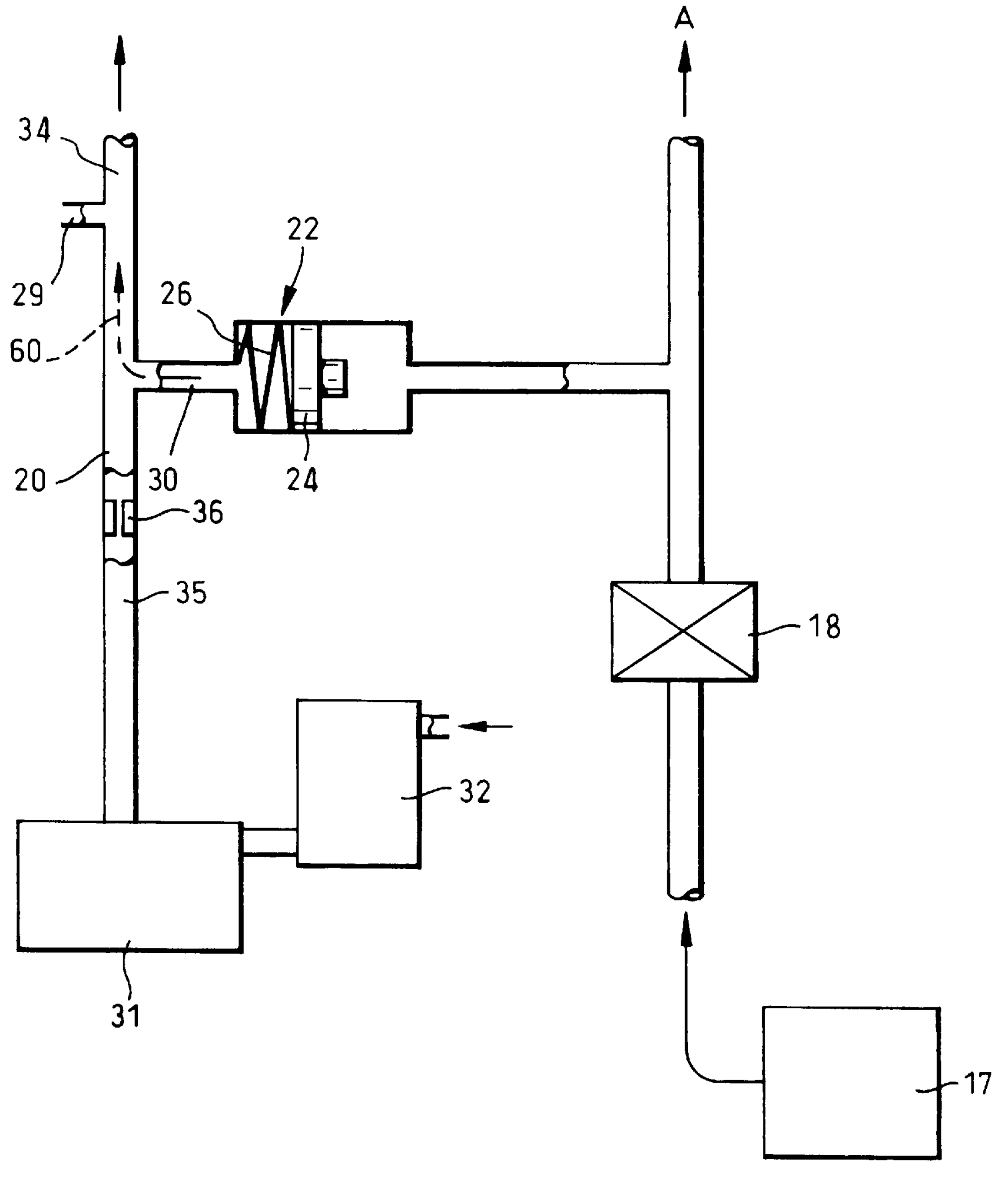
FIG. 3 is a schematic view of a second embodiment of a lubrication system in accordance with the present invention.

A second embodiment of the invention is shown in FIG. 3. This embodiment is generally similar to the one shown in FIG. 2 and described above and operates in a similar way. Like reference numbers have been used for like components. In this embodiment there is no restrictor or valve 28 in the oil feed passages 30. Instead a restrictor or valve 36 is provided within the supply pipework 20 between the oil feed 35 from the main oil tank 32, via the oil pump 31, and the oil feed passage 30. This restrictor or valve 36 preferentially directs the oil delivered on starting by the free floating piston chamber 22 to flow into the oil pipework 20 as shown by arrow 60. Such a flow 60 being towards the bearing oil supply pipe 24, where it is required, rather than towards the oil chamber 32 and oil pump 31 via pipes 35.

Once the engine driven oil pump 31 has taken over the supply of pressurised oil to the oil pipework 20, and the starter air has been cut off by valve 18, the oil will flow directly from the oil pump 31 into the oil pipework 20, via pipe 35, to the bearing oil supply pipe 34 and elsewhere 29 in the engine. The oil flows freely through the restrictor or valve 36. Oil from the oil pump 31 in the oil pipework will also eventually overcome the restrictor 36 and flow through passage 30 into the free floating piston chamber 22. The pressure of this oil, being greater than that on the 'air' side of the piston 29 will move the piston towards the 'air' side so refilling the chamber 22. Once the chamber is refilled the flow will cease.

Figure 4:
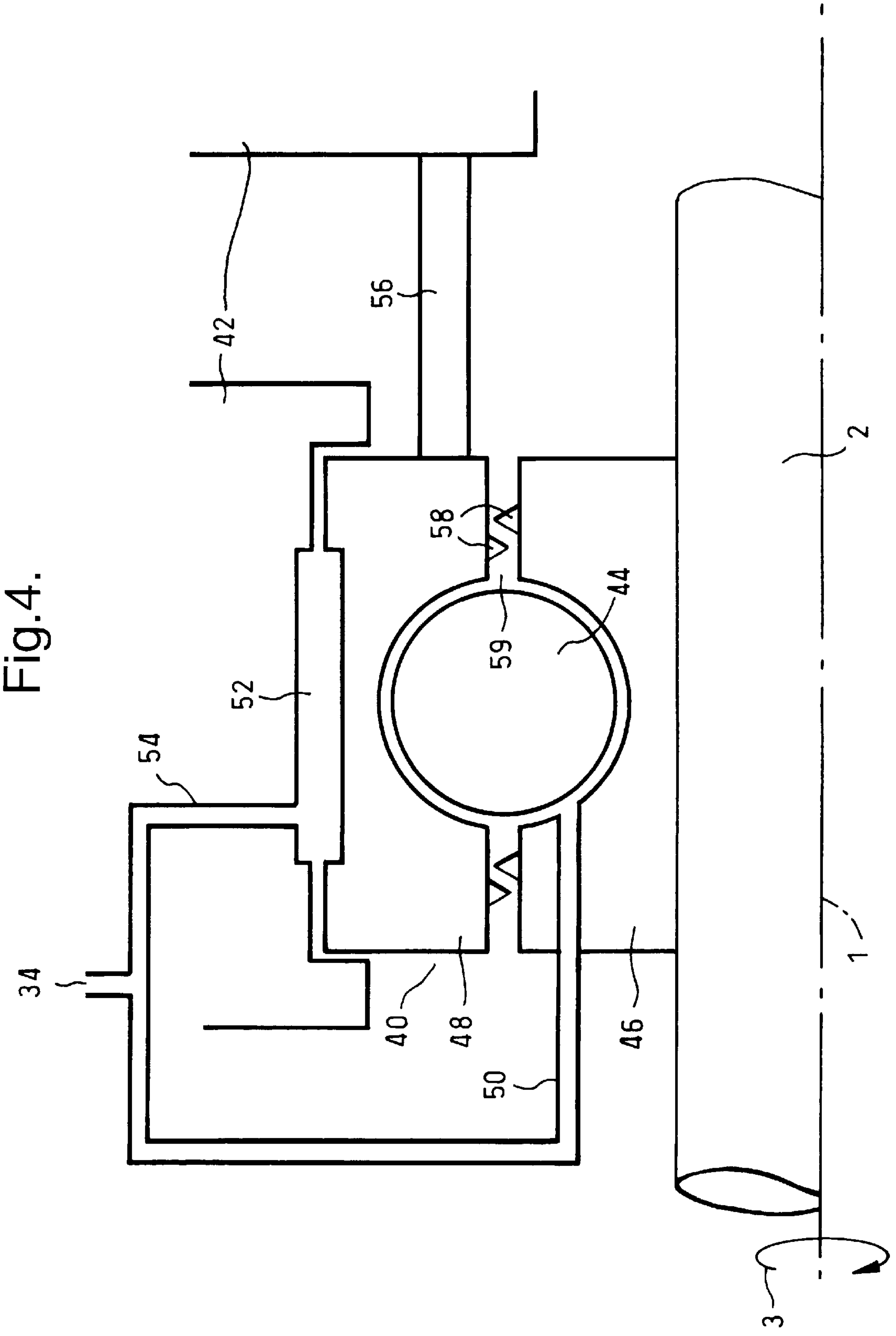
FIG. 4 is a diagrammatic view of a bearing for use with which the present invention is particularly suited.

The invention is particularly applicable for use with gas turbine engines in which there are bearings which incorporate an oil damper, as illustrated diagrammatically in FIG. 4. The bearings in particular being used to locate and mount the engine shafts. The oil damper is provided to minimise the effect of the dynamic loads transmitted from the rotating assemblies 2,46 to the bearings 40, their mountings 42, and the remainder of the engine 10. A typical arrangement is a squeeze film damper provided with the bearing mounting arrangement and illustrated diagrammatically in FIG. 4.

The bearing 40 is a conventional annular ball bearing type comprising a number of balls 44 which are free to move within an annular inner 46 and outer 48 race. The inner race 46 is attached to an engine shaft 2 which rotates 3 about an engine axis 1 and drivingly interconnects the turbines to the compressors/fan. The outer race 48 is connected to a bearing housing 42 and therethrough to the rest of the engine 10. The inner 46 and outer 48 races are concentric and rotate relative to each other. The balls 44 locate the axial positions of the races 46,48. The bearing thereby locates and mounts the shaft 2 within the engine 10.

A small annular chamber 52 is defined between the outer race 48 and the bearing housing 42. This chamber 52 is filled with oil, supplied via an oil supply pipe 54 from the bearing oil supply 34 of the oil pipework 20. An oil film is thereby provided in this chamber 52 between the bearing housing 42 and the bearing 40. The oil film, being a fluid, dampens the radial motion of the rotating assembly 2,46, and the bearing 40. It also dampens the dynamic loads that are transmitted to the bearing housing 42. Thus the vibration level of the engine 10 and the possibility of damage by fatigue is reduced.

An annular torsion structure 56 is also provided to directly connect the bearing 40 to the bearing housing 42. The torsion structure 56 flexes to permit a limited degree of movement of the bearing relative to the bearing housing 42. The flexing of the torsion structure 56 also provides a degree of resistance to such radial movement of the bearing 40.

The degree of damping provided by the oil film within the chamber 52 is dependent, at least in part, upon the pressure of the oil within the chamber 52 which is controlled in part by the exit restriction 58 which restricts oil leakage from the chamber 52. Consequently to reduce or prevent vibration damage to the bearing 40 and/or the engine 10 sufficient oil pressure needs to be supplied to the chamber 52 as soon as the shaft 2 starts to rotate 3 at any significant speed. With conventional systems this has been a particular problem on start up. However, it is easily addressed by the present invention in which the arrangements shown and described in FIGS. 2 and 3 are used to supply, via pipe 34, oil to the bearing oil film chamber 52. Such arrangements providing sufficient oil pressure within the chamber 52 to provide sufficient damping of the shaft 2 during start up.

To provide lubrication between the spaced ball bearings 44, inner race 46 and outer race 48 oil is supplied via feed pipe 50 and oil jet 51 to the interface 59 between these components 44,46,48 of the bearing 40. The oil jet 51 sprays oil onto suitable oilways 49 in the bearing 40 which connect with and supply the areas of the bearing 40 requiring lubrication with oil. To ensure adequate lubrication and reduce damage on start up this lubricating oil delivered by feed pie 50 and oil jet 51 is also supplied from feed pipe 34.

I claim:

1. A gas turbine engine oil based lubrication system which comprises a main oil supply and oil pressurisation means, an air supply means being arranged to provide a supply of compressed air to the gas turbine engine during at least part of the operation of the gas turbine engine, wherein the lubrication system further comprises a supplementary oil supply chamber and oil pressurisation means which are adapted to provide, when said chamber is exposed to said compressed air, a discrete quantity of oil from said chamber and oil pressurisation within at least a part of the oil based lubrication system.

2. A gas turbine engine lubrication system as claimed in claim 1 in which the supplementary oil pressurisation means includes valve means to control the provision of the discrete quantity of oil and oil pressurisation during starting of the gas turbine engine.

3. A gas turbine engine lubrication system as claimed in claim 1 in which the air supply means is further arranged to substantially simultaneously provide a supply of compressed air to an engine starter unit.

4. A gas turbine engine lubrication system as claimed in claim 1 in which the air supply means is arranged to provide at least part of the oil pressurisation within the supplementary oil supply chamber and oil pressurisation means.

5. A gas turbine engine lubrication system as claimed in claim 1 in which the supplementary oil supply chamber and oil pressurisation means comprise a free floating piston provided within said chamber.

6. A gas turbine engine lubrication system as claimed in claim 5 in which the piston is arranged to be moved by a supply of compressed air.

7. A gas turbine engine lubrication system as claimed in claim 6 in which a biasing means is provided to oppose the movement of said piston by supply of compressed air.

8. A gas turbine engine lubrication system as claimed in 1 in which the gas turbine engine comprises a bearing arranged to be provided with oil and oil pressurisation by the supplementary oil supply and pressurisation means.

9. A gas turbine engine lubrication system as claimed in claim 1 in which the supplementary oil supply and pressurisation means are arranged to provide oil and oil pressurisation to an oil damper.

10. A gas turbine engine lubrication system as claimed in claim 9 in which the oil damper is arranged within a bearing mounting within the gas turbine engine, the oil damper comprises an oil squeeze film.

11. A gas turbine engine lubrication system as claimed in claim 1 in which there is provided a common oil pipework into which the main oil supply and oil pressurisation means and the supplementary oil supply chamber and oil pressurisation means are connected.

12. A gas turbine engine lubrication system as claimed in claim 11 in which restriction means are provided to restrict, in use, a flow of oil from the common pipework into the supplementary oil supply chamber and oil pressurisation means.

* * * * *